Patented Oct. 16, 1928.

1,688,045

UNITED STATES PATENT OFFICE.

LEON W. GELLER, OF HAMBURG, NEW YORK, ASSIGNOR TO NATIONAL ANILINE & CHEMICAL CO., INC., OF NEW YORK, N. Y., A CORPORATION OF NEW YORK.

MONAZO DYES FROM DISULFONAPHTHYL PYRAZOLONES AND O-AMINOHYDROXY-BENZENES.

No Drawing. Application filed December 23, 1925. Serial No. 77,377.

This invention relates to the manufacture and production of new monazo dyestuffs of the pyrazolone series which are of value for dyeing wool and other material, and for the production of useful lakes and pigments. The product obtained by treating material, as by dyeing, printing or painting, with one or more of the new dyestuffs, or a lake or pigment thereof, constitutes a part of the present invention.

The new monazo dyestuffs can be prepared by coupling a diazotized ortho-aminophenol body, or a homologue or a nuclear substitution product thereof, and which contains an acid group, i. e., a carboxyl or a sulfonic acid group, or both, as a substituent in the benzene nucleus, with a 1-(4'.8'-disulfo-2'-naphthyl)-5-pyrazolone body.

The new dyestuffs in the free state correspond with the formula:

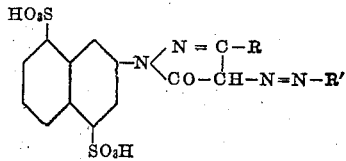

wherein R signifies a methyl or a carboxyl group and R' represents a carboxylated and/or a sulfonated aryl radical of the benzene series which carries a hydroxyl group in ortho position to the azo bridge. The new dyestuffs in the form of their sodium salts are soluble in concentrated sulfuric acid and soluble in water, and dye wool in an acid bath yellow to red to brown shades which change on after-chroming to yellow-red to blue-red tints. Upon reduction, for example with stannous chloride and hydrochloric acid, the new dyestuffs yield a 1-(4'.8'-disulfo-2'-naphthyl)-4-amino-5-pyrazolone body and a carboxylated and/or sulfonated 2-amino-1-hydroxy-aryl body of the benzene series.

In producing the azo dyestuffs of the present invention, one molecular proportion of the diazo compound of the ortho-aminohydroxyaryl body of the benzene series, and which carries an acid group in the benzene nucleus, is added to a well stirred solution of the 1-(4'.8'-disulfo-2'-naphthyl)-5-pyrazolone body (in slight excess of one molecular proportion) which is rendered and kept alkaline throughout the combination. When the coupling is complete, the mixture is heated to 40°–90° C. and the dyestuff isolated in any suitable manner.

The following specific example will further illustrate the invention, but it will be understood that the invention is not limited thereto. The parts are by weight.

*Example.*—18.9 parts of 2-aminophenol-4-sulfonic acid is dissolved in 600 parts water and 13 parts of 30 percent hydrochloric acid and diazotized at a temperature of about 0°–10° C. in the usual manner with about 7 parts of sodium nitrite. The diazo solution thus obtained is introduced into a well-stirred solution of 45 parts of the sodium salt of 1-(4'.8'-disulfo-2'-naphthyl)-3-methyl-5-pyrazolone dissolved in about 500 parts water containing sufficient quantity of sodium carbonate to mantain an alkaline reaction throughout the combination. During the combination, the temperature is kept at about 0°–10° C. The mixture is stirred for several hours, and when the combination is complete, the solution is heated to about 70° C. and the dyestuff precipitated by the addition of common salt, filtered off, pressed and dried.

The new dyestuff thus obtained corresponds in the free state with the probable formula:

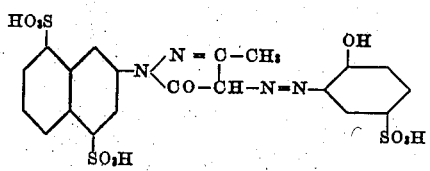

and in the form of its sodium salt constitutes a yellowish-brown powder soluble in water with a yellowish orange color, and dyes wool in an acid bath a yellowish orange shade which is changed by after-chroming to a reddish orange tint of excellent fastness to light and to washing. Upon reduction, it yields 1-(4'.8'-disulfo-2'-naphthyl)-3-methyl-4-amino-5-pyrazolone and 2-amino-phenol-4-sulfonic acid.

In a similar manner, other monazo dyestuffs which possess analagous properties may be produced by combining the same pyrazolone with a diazo compound of other orthoaminophenol bodies, their homologues and nuclear substitution products, and which carry an acid group as a substituent in the benzene nucleus, such as, for example, 2-aminophenol-4-carboxylic acid to form a dye which has the formula

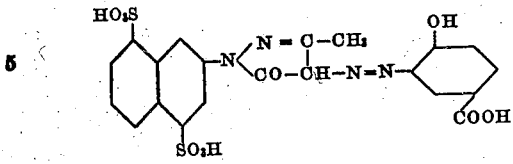

2-aminophenol-6-carboxylic acid, 2-aminophenol-5-sulfonic acid, 2-aminophenol-4-sulfo-6-carboxylic acid to produce

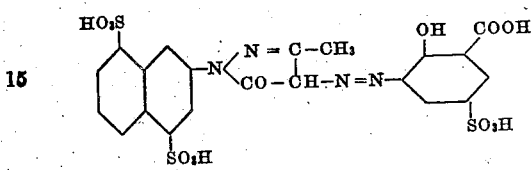

4-nitro-2-aminophenol-6-sulfonic acid, 4-nitro-2-aminophenol-6-carboxylic acid, 6-nitro-2-aminophenol-4-sulfonic acid, 6-chlor-2-aminophenol-4-sulfonic acid to form

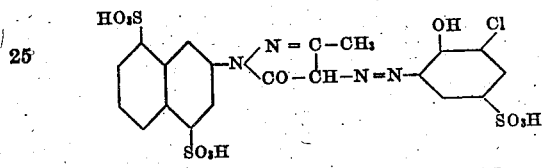

4-chlor-2-aminophenol-6-sulfonic acid, 3-amino-2-cresol-5-sulfonic acid, 3-amino-4-cresol-5-sulfonic acid, 3-amino-4-cresol-6-sulfonic acid to obtain

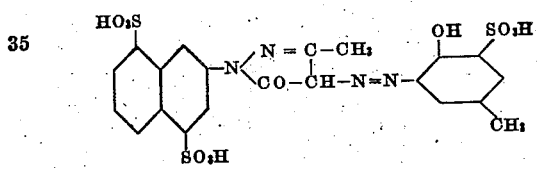

etc.

In the specification and claims it will be understood that the pyrazolones contemplated in the present invention carry a methyl or a carboxyl group in the 3-position of the pyrazolone nucleus unless otherwise specified, and are capable of combining in the 4-position with diazo compounds.

1 claim:

1. As new products, the monazo pyrazolone dyestuffs obtainable by combining a diazotized ortho-aminohydroxyaryl body of the benzene series which carries an acid group in the benzene nucleus with a 1-(4'.8'-disulfo-2'-naphthyl)-5-pyrazolone body; said dyestuffs in the free state corresponding with the probable formula:

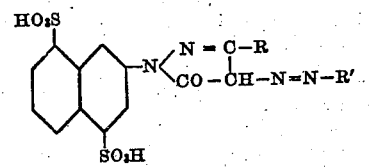

wherein R signifies a methyl or a carboxyl group and R' represents an aryl radical of the benezene series which carries an acid group and a hydroxyl group in the benzene nucleus, the hydroxyl group being in ortho position to the azo bridge.

2. As new products, the monazo pyrazolone dyestuffs obtainable by combining a diazotized ortho-aminophenol body which carries a sulfo-group as a substituent in the benzene nucleus with a 1-(4'.8'-disulfo-2'-naphthyl)-5-pyrazolone body; said dyestuffs in the free state corresponding with the probable formula:

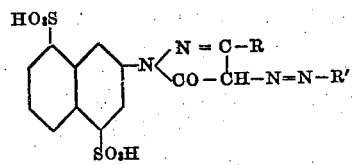

wherein R signifies a methyl or a carboxyl group and R' represents a nucleus of the benzene series which carries a sulfo-group and a hydroxyl group, the hydroxyl group being in the ortho position to the azo bridge.

3. As a new product, the monazo pyrazolone dyestuff which in the free state corresponds with the probable formula:

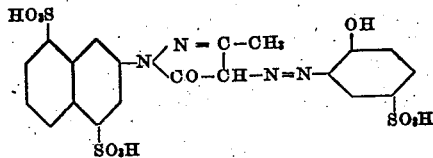

4. Material treated with a dyestuff of claim 1.

5. Material dyed with the dyestuff of claim 2.

6. Material dyed with the dyestuff of claim 3.

In testimony whereof I affix my signature.

LEON W. GELLER.